(12) United States Patent
Tallantyre et al.

(10) Patent No.: US 9,922,679 B2
(45) Date of Patent: Mar. 20, 2018

(54) SLOW MOTION VIDEO PLAYBACK METHOD FOR COMPUTING DEVICES WITH TOUCH INTERFACES

(71) Applicants: James Tallantyre, London (GB); George Mitchard, London (GB)

(72) Inventors: James Tallantyre, London (GB); George Mitchard, London (GB)

(*) Notice: Subject to any disclaimer, the term of this patent is extended or adjusted under 35 U.S.C. 154(b) by 0 days.

(21) Appl. No.: 15/170,860

(22) Filed: Jun. 1, 2016

(65) Prior Publication Data

US 2017/0352378 A1    Dec. 7, 2017

(51) Int. Cl.
| | |
|---|---|
| *H04N 5/783* | (2006.01) |
| *G11B 27/00* | (2006.01) |
| *G06F 3/041* | (2006.01) |
| *G06F 3/0488* | (2013.01) |

(52) U.S. Cl.
CPC ............ *G11B 27/005* (2013.01); *G06F 3/041* (2013.01); *G06F 3/04883* (2013.01)

(58) Field of Classification Search
CPC .............................. G11B 27/005; G06F 3/041
See application file for complete search history.

(56) References Cited

U.S. PATENT DOCUMENTS

2012/0274662 A1* 11/2012 Kim ...................... G06F 3/0488
                                                            345/650
2013/0145269 A1*  6/2013 Latulipe .................. G06F 3/048
                                                            715/720

* cited by examiner

*Primary Examiner* — Hung Dang
*Assistant Examiner* — Girumsew Wendmagegn

(57) ABSTRACT

Disclosed is a system and method for controlling the playback speed, and user experience, of watching slow motion video content on a touch sensitive computing device such as a mobile phone, tablet or laptop with a touch sensitive screen. Key features of the disclosure are the simplicity of the user interface and the instant visual feedback given to the user.

6 Claims, 3 Drawing Sheets

SLOW MOTION VIDEO PLAYBACK METHOD FOR COMPUTING DEVICES WITH TOUCH INTERFACES

U.S. PATENT DOCUMENTS REFERENCED

U.S. patent application Ser. No. 13/603,178 by Andres, I et al. (hereinafter "Andres"), filed on Sep. 4, 2012 and titled "Gesture touch inputs for controlling video on a touchscreen", is hereby incorporated by reference in its entirety.

U.S. Pat. No. 8,405,621 B2 by Gehani, S et al. (hereinafter "Gehani"), filed on Sep. 29, 2008 and titled "Variable Rate Media Playback Methods for Electronic Devices with Touch Interfaces", is hereby incorporated by reference in its entirety.

U.S. Pat. No. 7,495,659 B2 by Marriott, G et al. (hereinafter "Marriott"), filed on Nov. 25, 2003 and titled "Touch pad for handheld device", is hereby incorporated by reference in its entirety.

U.S. Pat. No. 7,663,607 B2 by Hotelling, S et al. (hereinafter "Hotelling"), filed on May 6, 2004 and titled "Multipoint touchscreen", is hereby incorporated by reference in its entirety.

U.S. Pat. No. 8,479,122 B2 by Hotelling, S et al. (hereinafter "Hotelling"), filed on Jul. 30, 2004 and titled "Gestures for touch sensitive input devices", is hereby incorporated by reference in its entirety.

U.S. Pat. No. 8,239,784 B2 by Hotelling, S et al. (hereinafter "Hotelling"), filed on Jan. 18, 2005 and titled "Mode-based graphical user interfaces for touch sensitive input devices", is hereby incorporated by reference in its entirety.

U.S. patent application Ser. No. 11/850,635 by Jobs, S P et al. (hereinafter "Jobs"), filed on Sep. 5, 2007 and titled "Touch Screen Device, Method, and Graphical User Interface for Determining Commands by Applying Heuristics", is hereby incorporated by reference in its entirety.

U.S. patent application Ser. No. 11/682,872 by Rosenberg, L B (hereinafter "Rosenberg"), filed on Mar. 6, 2007 and titled "Touch-gesture control of video media play on handheld media players", is hereby incorporated by reference in its entirety.

U.S. patent application Ser. No. 14/743,013 by Checkley G et al. (hereinafter "Checkley"), filed on Jun. 18, 2015 and titled "Methods, systems and media for controlling playback of video using a touchscreen", is hereby incorporated by reference in its entirety.

U.S. patent application Ser. No. 13/076,854 by Hill S et al. (hereinafter "Hill"), filed on Mar. 31, 2011 and titled "Substituting touch gestures for GUI or hardware keys to control audio video play", is hereby incorporated by reference in its entirety.

U.S. patent application Ser. No. 13/184,415 by Kim C et al. (hereinafter "Kim"), filed on Jul. 15, 2011 and titled "Mobile terminal and method for controlling playback speed of mobile terminal", is hereby incorporated by reference in its entirety.

U.S. patent application Ser. No. 13/541,203 by Shakespeare D M (hereinafter "Shakespeare"), filed on Jul. 3, 2012 and titled "Touch device gestures", is hereby incorporated by reference in its entirety.

U.S. patent application Ser. No. 12/713,118 by Hinckley K P et al. (hereinafter "Hinckley"), filed on Feb. 25, 2010 and titled "Multi-screen bookmark hold gesture", is hereby incorporated by reference in its entirety.

FOREIGN PATENT DOCUMENTS REFERENCED

European Patent Application No. 05105669.5 by Wilson A D, et al. (hereinafter "Wilson"), filed on Jun. 26, 2005 and titled "Recognizing gestures and using gestures for interacting with software applications", is hereby incorporated by reference in its entirety.

OTHER PUBLICATIONS

International Report on Patentability and Written Opinion for International Application No. PCT/US2008/086538 (hereinafter "Written Opinion"), dated April2005, is hereby incorporated by reference in its entirety.

BACKGROUND

Slow motion video (commonly abbreviated to "slowmo") is an effect in video making whereby time appears to have slowed down. It was invented by the Austrian Priest August Musger in the $20^{th}$ century.

Slowmo can provide an exciting view of everyday events and it is typically used to demonstrate skill and style in sport events, to recapture a key sporting moment as a slowmo replay or to demonstrate natural phenomena such as a drop of water hitting a leaf.

The creation of a Slowmo video starts with high speed capture by the camera. This was called "overcranking" is early film making. The recorded film would then be played back at a normal, or slower frame rate making the motion appear slower. If the subject was captured at 120 fps, and played at 30 fps for example, the motion would appear at quarter speed.

Slowmo requires both faster capture and slower playback. If a user was to just use slower playback on an un-overcranked video the playback would result in stuttered motion. The degree of slowdown varies depending on the application, a 2-4× slowdown is considered standard for replays or effects. Slowmo pushes the technical boundaries of camera systems for more frame per second and for the playback system to ensure a smooth slow down of the video and an enhanced user experience of a quick motion action. The introduction of slowmo video capture and playback in the iPhone 5s by Apple, Inc in 2013 and the introduction of slowmo for the popular GoPro action camera range, often used in extreme action videography, from GoPro, Inc in 2013 introduced the concept and experience of slowmo to the masses.

Once the video has been captured using overcranking, the user typically edits the file using a a specialist slowmo software media player on a computing device which enables the user to select with mouse clicks the speed of playback during certain sections of the video to create a video experience that the user can share with other people using social media applications, or can be hosted on video websites. When a user plays the video they quite often have mouse click, or touch screen controls to very the speed of the whole video playback in predefined steps and forward or rewind the video while it is playing.

These type of touch interfaces are typically representations of buttons on the media player, similar to the controls on a DVD or media player connected to a TV or AV device.

In 2008 Gehani disclosed a method for electronic playback of a standard non-overcranked video using touch gestures on a computing device, mobile phone, or tablet which incorporated a touch screen interface. By swiping a finger left or right across the video while it is playing, the video would fast forward, or rewind at a sped proportionate to the length and speed of the swipe. This enabled a more intuitive user interface for controlling the playback of a video on a portable device. Gehani also disclosed a method to increase the speed of play by tapping on the screen, where every tap would increase the video playback speed by a defined amount.

Later in 2012 Andres disclosed in his application a similar method to control the navigation of the video during playback using swipe controls on a touch sensitive screen, and to show the navigation using a plurality of frames in a file strip below the video.

Checkley in 2014 disclosed a method of "press and hold" to navigate to a specific point in a video sequence. He also disclosed a method to change the speed of the video by mapping points on the touch screen interface to specific speed settings for example 2× or 4×.

While these example provide methods to control video navigation and step changes in speed what makes the method in the present application unique from Gehani, Andres and Checkley is the simplicity of the control of the speed of the video in a slowmo playback, and the enhancement of the user experience through cleaner visual feedback of the slowmo. There is no need to represent buttons on the media player window which distract from the user experience of the slowmo, and there is no requirement to swipe across the screen thereby distracting the user from seeing the slowmo action on the screen.

BRIEF SUMMARY

A method and system are described herein that allow a user to playback a slowmo video and control the speed of the slowmo action replay, with a variable amount, using a very simple touch and hold action on a touch screen interface. The simplicity of the interface enables a cleaner and more immersive feel of the playback of the slowmo video.

In one embodiment the user touches the screen during slowmo playback and as long as the touch is static the video will slow down with variable rate change in speed the longer the touch is held static. Once the touch is released, the slowmo video will slowly increase its speed of playback with variable rate change until it is running at normal slowmo playback speed, typically 30 fps. In this embodiment the slowmo video, which are typically 5 seconds or less, plays in a continual loop so that the user is not distracted from having to fast forward, rewind, start, pause or stop the video during playback.

The concept of changing the speed of the playback of a slowmo video is not new; what is unique is the method and system described herein to allow the user in a very simple, intuitive and clean method to slow down and speed up the slowmo action in order to give the user a more immersive feel of the playback.

DETAILED DESCRIPTION

In one example, a user is playing back a slowmo video on their mobile phone using a slowmo playback application, hereinafter called the "Worm App" which incorporates the methods of slow motion video playback disclosed herein. They initiate a touch and static hold of the touch on the screen hereinafter called "Touch to Slow".

In a second example a user edits a slowmo video on their mobile phone using the Worm App and Touch to Slow and they then upload and share that edited video with friends who also have the Worm App and can use Touch to Slow to view the motion video.

Figure 1:
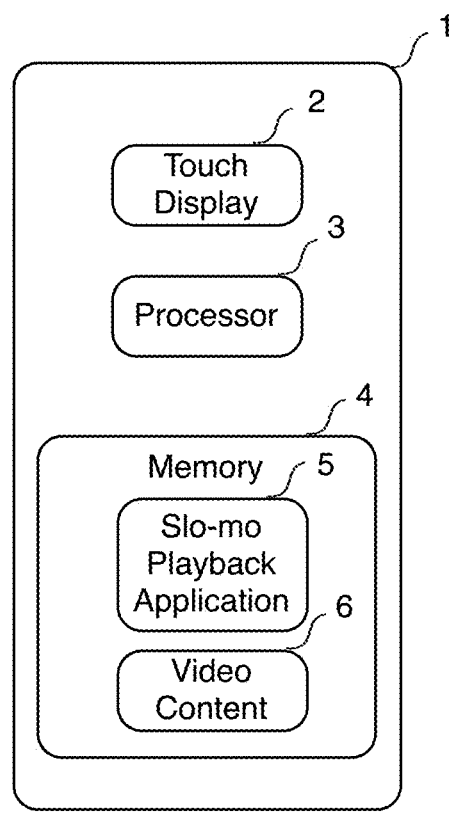
FIG. 1 is a block diagram of a mobile computing device with a touch sensitive screen.

In both embodiments, the Worm App resides on the mobile computing device, see FIG. 1. The touch display initiates the slowmo commands.

In the sections that follow, various slow motion video playback scenarios are described which describe the method and process with which the Worm App slows down the playback speed of the slowmo video. The scenarios described are given by way of example. The scenarios can be extended to include any and all other record, edit, playback and share related scenarios that might be relevant within the scope of the invention.

Two methods are described herein for achieving the user experience and are called "Method 1" and "Method 2".

Method 1

Figure 2:
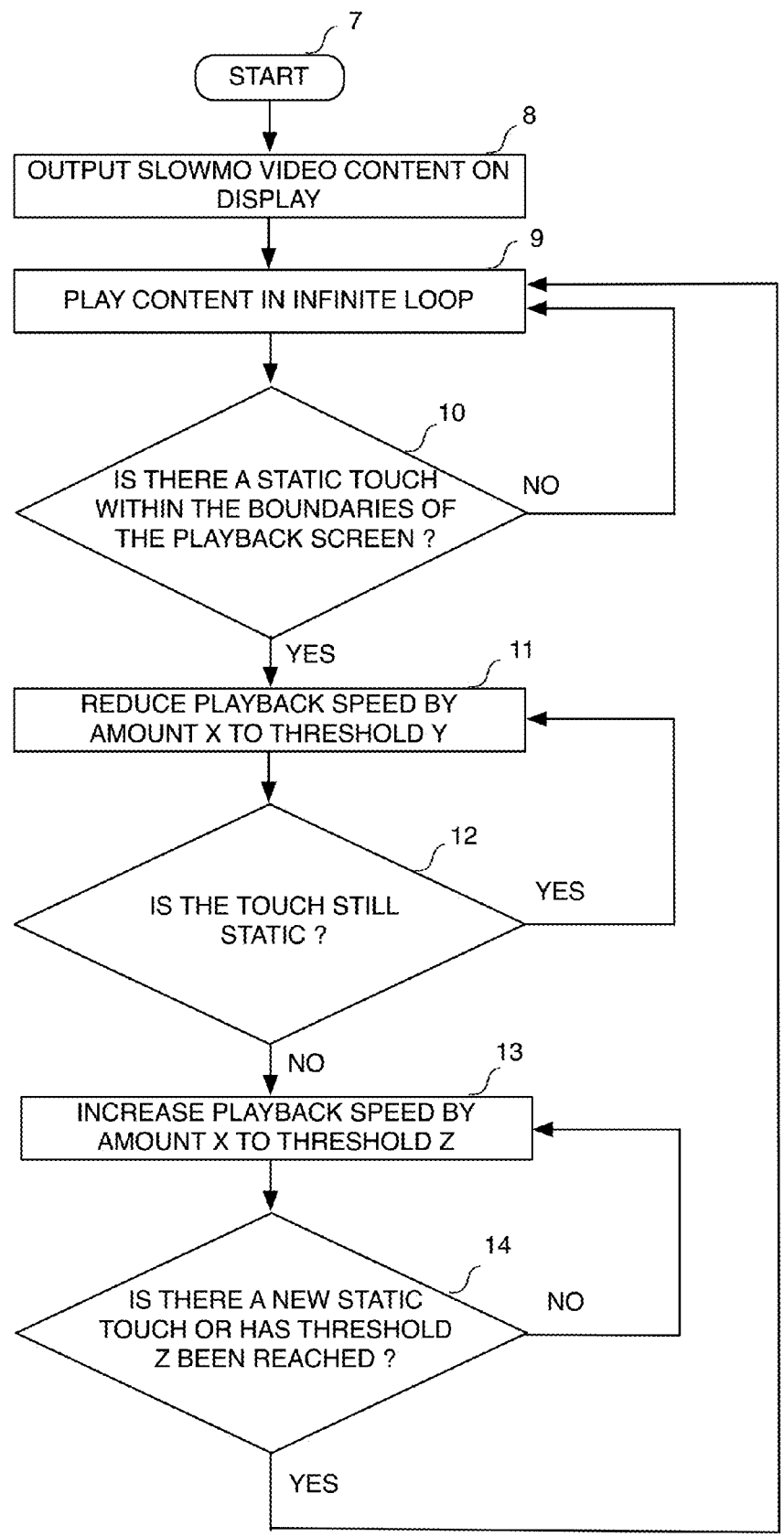
FIG. 2 is a touch to slow touch method, in accordance with one embodiment of the present invention.
Figure 3:
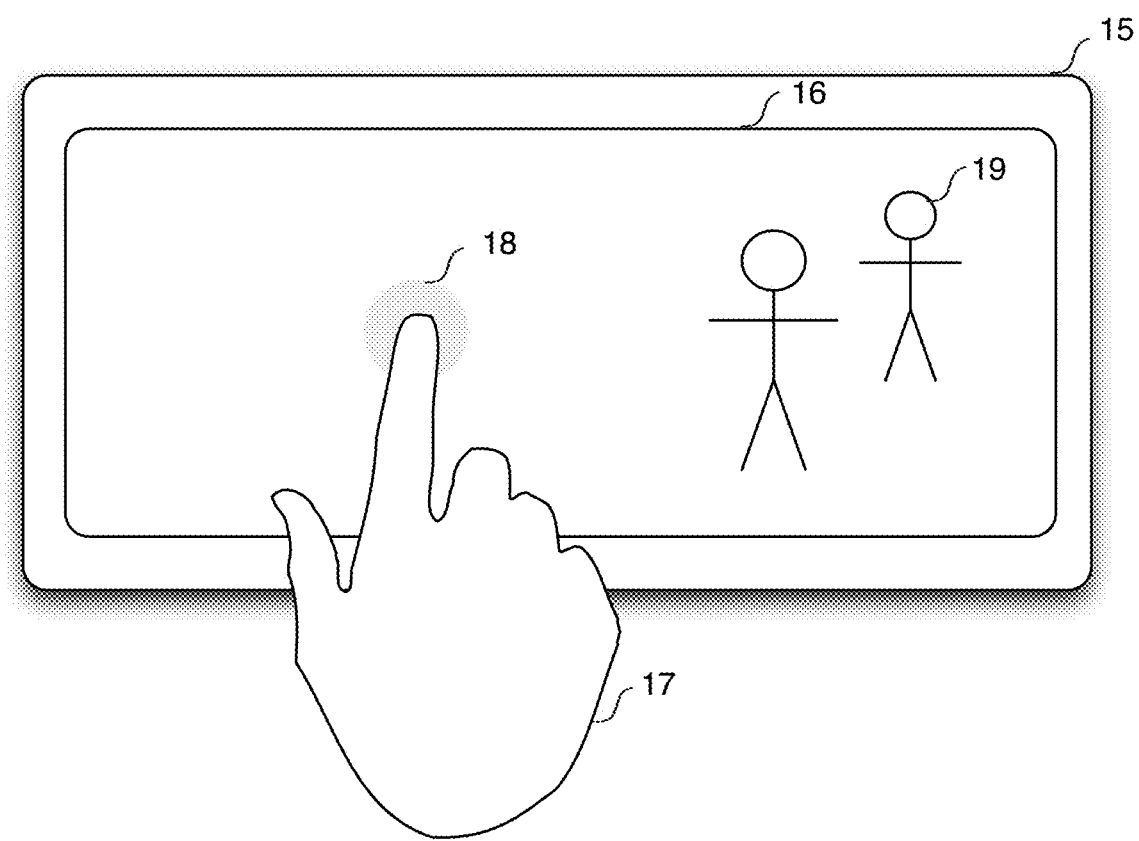
FIG. 3 is a perspective view of a mobile computing device playing a slow motion video and a user performing a static touch on the screen to slow the video down.

Reference is made to FIG. 1 which shows a block diagram of a mobile computing device with a touch sensitive screen, FIG. 2, which shows the touch to slow touch method for the slow down of the playback of a slowmo video and FIG. 3 which shows a perspective view of a mobile computing device playing a slow motion video and a user performing a static touch on the screen to slow the video down.

In step 1, the Worm App is started 7 and the latest video that is stored in the memory 4 of the computing device 1 is played automatically in an infinite loop 9 on the touch display of the device 2. In step 2, once the user sees a section of video that catches his interest and he would like to slow down the action, he places his FIG. 17 on the touch sensitive display 16. In step 3, the Worm App 5 senses the touch and static hold 18 of the finger 17 and starts to reduce the playback speed of the slow motion video in logarithmic increments the longer the touch is held 11. In this example the video playback rate is reduced by up to 4 ×over 400 ms. The user can touch and static hold his touch anywhere on the playback screen 16. In step 4, if the user would like to see the video speed up he releases his finger 17 and the video returns to normal playback speed of 30 fps over 400 ms as long as there is no further touch and static hold on the screen.

Method 2

Reference is made to FIG. 1, FIG. 2 and FIG. 3. In this example, the user is editing a slowmo video using the Worm App. While in edit mode, the user can vary the speed of the playback using the Touch to Slow method described herein by holding his finger 17 on the video playback screen. Once the user has completed their edits the user can save the video 6 and upload it onto a Worm App cloud based server and can enable other people to watch and make comments on the video in the public domain.

When another user, who has permissions to view the slowmo video open their Worm App 5 they can see the latest video from the user playing and looping automatically. They can see in normal playback the slowmo effects that the user has added to their video during the edit. Whilst watching the looped video, the user can place their finger 17 on the touch screen to enable Touch to Slow and slow down the video playback further down to a predetermined threshold set on the Worm App in order to better experience the motion video and watch specific details of the motion.

What is claimed is:

1. A method for controlling the playback speed, and user experience of watching, slow motion video content on a portable electronic computing device with a touch sensitive screen, the method comprising:
   outputting on the display the video content;
   automatically playing the video content in an infinite loop;
   detecting a touch within the boundaries of the video playback screen on the touch interface;
   in response to a static hold of the touch, reducing the playback speed in predefined logarithmic increments down to a predefined lower limit, as long as the static hold continues;
   in response to detecting cessation of user contact with the touch interface, the playback speed will increase back to normal playback speed in predefined logarithmic increments, as long as no further touch is detected.

2. The method of claim 1, where the playback speed increases in predefined logarithmic increments the further the user drags the static hold of the touch downwards and away from the initial touch point.

3. A computing device, comprising:
   at least one processor;
   machine-readable code stored on the computing device comprising executable instructions that are executable by at least one processor, and which comprise:
   executable instructions to output on the display the video content;
   executable instructions to automatically play the video content in an infinite loop;
   executable instructions to detect a touch within the boundaries of the video playback screen on the touch interface;
   executable instructions to detect a static hold of the touch and to reduce the playback speed in predefined logarithmic increments down to a predefined lower limit, as long as the static hold continues;
   executable instructions to detect a cessation of user contact with the touch interface;
   executable instructions to increase the playback speed back to normal playback speed in predefined logarithmic increments, as long as no further touch is detected.

4. The computing device of claim 3 where the playback speed increases in predefined logarithmic increments the further the user drags the static hold of the touch downwards and away from the initial touch point.

5. A non-transitory computer-readable storage medium comprising executable instructions for causing at least one processor of a computing device to perform operations comprising:
   outputting on the display the video content;
   automatically playing the video content in an infinite loop;
   detecting a touch within the boundaries of the video playback screen on the touch interface;
   detecting a static hold of the touch and to reduce the playback speed in predefined logarithmic increments down to a predefined lower limit, as long as the static hold continues;
   detecting a cessation of user contact with the touch interface;
   increasing the playback speed back to normal playback speed in predefined logarithmic increments, as long as no further touch is detected.

6. The non-transitory computer-readable storage medium of claim 5 where the playback speed increases in predefined logarithmic increments the further the user drags the static hold of the touch downwards and away from the initial touch point.

* * * * *